United States Patent
Blödt et al.

(10) Patent No.: US 11,699,857 B2
(45) Date of Patent: Jul. 11, 2023

(54) DEVICE FOR TRANSFERRING SIGNALS FROM AN AT LEAST PARTIALLY METAL HOUSING DESIGNED FOR USE IN AN EXPLOSION-PRONE REGION

(71) Applicant: Endress+Hauser SE+Co. KG, Maulburg (DE)

(72) Inventors: Thomas Blödt, Steinen (DE); Harald Schäuble, Lörrach (DE); Dirk Lill, Freiburg (DE); Andreas Kaiser, Kaisten (CH); Fabian Bänninger, Rickenbach (CH)

(73) Assignee: Endress+Hauser SE+Co. KG, Maulburg (DE)

( * ) Notice: Subject to any disclaimer, the term of this patent is extended or adjusted under 35 U.S.C. 154(b) by 139 days.

(21) Appl. No.: 17/599,698

(22) PCT Filed: Mar. 24, 2020

(86) PCT No.: PCT/EP2020/058190
§ 371 (c)(1),
(2) Date: Sep. 29, 2021

(87) PCT Pub. No.: WO2020/200926
PCT Pub. Date: Oct. 8, 2020

(65) Prior Publication Data
US 2022/0200155 A1 Jun. 23, 2022

(30) Foreign Application Priority Data
Mar. 30, 2019 (DE) .................... 10 2019 108 359.1

(51) Int. Cl.
*H01Q 13/18* (2006.01)
*H01Q 1/00* (2006.01)
*H01Q 1/32* (2006.01)

(52) U.S. Cl.
CPC ............ *H01Q 13/18* (2013.01); *H01Q 1/002* (2013.01); *H01Q 1/3233* (2013.01)

(58) Field of Classification Search
CPC .... H01Q 13/10; H01Q 13/103; H01Q 13/106; H01Q 13/12; H01Q 13/14; H01Q 13/16; H01Q 13/18; H01Q 1/002; H01Q 1/3233
See application file for complete search history.

(56) References Cited

U.S. PATENT DOCUMENTS

| 10,276,939 | B1* | 4/2019 | Webb | H01Q 9/0464 |
| 2009/0081963 | A1* | 3/2009 | Boren | H01Q 21/30 |
| | | | | 455/90.1 |
| 2013/0127679 | A1* | 5/2013 | Harris | H01Q 15/246 |
| | | | | 343/756 |

FOREIGN PATENT DOCUMENTS

| DE | 102012100903 A1 | 8/2013 |
| DE | 102014117315 A1 | 6/2016 |

(Continued)

*Primary Examiner* — Seokjin Kim
(74) *Attorney, Agent, or Firm* — Christopher R. Powers; Endress+Hauser (USA) Holding, Inc.

(57) ABSTRACT

A device for transferring signals using electromagnetic waves of a certain wavelength and based on a housing formed at least partially of metal for use in an explosion endangered area includes the housing; a transmitting/receiving unit for producing and/or receiving the electromagnetic waves; at least one primary antenna for out-coupling and/or in-coupling of the electromagnetic waves; at least one slot-shaped housing opening; and a formed part, which is made of a material having a dielectric number significantly greater than one and which extends to a predetermined maximum depth into the housing opening.

19 Claims, 6 Drawing Sheets

(56) References Cited

FOREIGN PATENT DOCUMENTS

| | | | |
|---|---|---|---|
| DE | 102014118391 A1 | 6/2016 | |
| DE | 202016006358 U1 | 1/2017 | |
| DE | 102016211836 A1 | 2/2017 | |
| EP | 2654124 A | 10/2013 | |
| EP | 2654124 A1 * | 10/2013 | ............ H01Q 1/002 |
| EP | 3016201 A1 | 5/2016 | |
| WO | WO-2014030488 A1 * | 2/2014 | ............... G01S 7/03 |

* cited by examiner

DEVICE FOR TRANSFERRING SIGNALS FROM AN AT LEAST PARTIALLY METAL HOUSING DESIGNED FOR USE IN AN EXPLOSION-PRONE REGION

CROSS-REFERENCE TO RELATED APPLICATIONS

The present application is related to and claims the priority benefit of German Patent Application No. 10 2019 108 359.1, filed on Mar. 30, 2019, and International Patent Application No. PCT/EP2020/058190, filed on Mar. 24, 2020, the entire contents of which are incorporated herein by reference.

TECHNICAL FIELD

The invention relates to a device for transferring signals from an at least partially metal housing using electromagnetic waves of a certain wavelength, a field device adapter for wireless data transfer and a field device of automation technology.

BACKGROUND

In automation technology, especially in process automation technology, field devices are often applied, which serve for determining, optimizing and/or influencing process variables. Serving for registering process variables are sensors, such as, for example, fill level measuring devices, flow measuring devices, pressure- and temperature measuring devices, conductivity measuring devices, etc., which register the corresponding process variables, fill level, flow, pressure, temperature, and conductivity. Serving for influencing process variables are actuators, such as, for example, valves or pumps, via which the flow of a liquid in a pipeline section, or the fill level in a container, can be changed. Referred to as field devices are, in principle, all devices, which are applied near to a process and which deliver, or process, process relevant information. In connection with the invention, the terminology, field devices, thus, refers also to remote I/Os, and, in general, devices, which are arranged at the field level. A large number of such field devices are produced and sold by the firm, Endress+Hauser.

Currently in a large number of existing automated plants, two-conductor field devices, which are connected via a two-conductor line to a superordinated unit, for example, a control unit PLC, are still quite common. Two-conductor field devices are embodied in such a manner that the measured or actuating values are communicated, i.e., transmitted or transferred, as main process variable via the two-conductor line, or two-conductor cable, in analog manner in the form of a 4-20 mA signal. For sending all other data, the HART protocol has gained acceptance, in the case of which the analog, electrical current signal of 4-20 mA is superimposed with a frequency signal serving as a digital, two-conductor signal for data transmission. In the HART protocol, data transmission is based on switching between 1200 Hz and 2400 Hz, wherein the lower frequency is a logical "0" and the higher frequency a logical "1". In this way, the slowly variable, analog, electrical current signal remains unaffected by the frequency superpositioning. In this way, the HART protocol unites analog and digital communication.

In the course of increased digitalization, it is, however, desirable that the data be transmittable not only via the two-conductor line, thus, purely by wire, but, also communicable wirelessly by electromagnetic waves. For example, it may be desired to transfer the data wirelessly to a database, for example, a cloud database, and to make it available there, or to transmit data wirelessly between the field device and a mobile service unit, in order, for example, to parameter, or configure, the field device wirelessly via the mobile servicing device.

Applied frequently for wireless data transfer are field device adapters, with which existing field devices are retrofitted for wireless data transfer. Such field device adapters can be incorporated, in such case, directly into the two-conductor line, i.e., the field device adapter is connected virtually as an independent unit between the superordinated unit and the field device. Alternatively, the field device adapter can also be connected directly in the field device, for example, mechanically connected via a cable gland and electrically connected with a field device electronics.

Frequently, the field device adapters, and the field devices, are applied in regions, in which the danger of explosion is present. In general, combustible and explosive materials in the form of gases, vapors, mists or dusts can occur in many fields of industry. As important fields in this case can be named coal mining, the chemicals and petrochemicals industries, however, also the foods industry, milling operations, the waste water field and biogas production. These combustible materials can, in mixture with oxygen, form explosive atmospheres.

There are three prerequisites for an explosion to occur: a combustible gas or dust, oxygen and an ignition source. For the manufacturer of devices and protection systems, this means that its devices and plants must be so developed and established that they pose no source of ignition—also in the event of possible malfunctions. For this, so-called ignition protection types have been defined, which establish structural and circuit techniques for devices for explosion endangered applications.

For instance, at least partially metal housings must be used. This has, however, the disadvantage that, in general, no wave radiation for wireless data transfer is possible. Furthermore, possible add-ons to the field device adapters, or the field devices, in order nevertheless to enable wave propagation, such as, for example, external rod antennas, represent housing weak points, so that such should be avoided.

Furthermore, if an antenna gets broken off, high field strengths at the base, which could exceed the allowable energy density in explosion endangered areas of an automated plant, must be prevented.

SUMMARY

An object of the invention is to provide a device, which enables use in an explosion endangered area and nevertheless has a high radio range, preferably in all "sky directions", i.e. as little as possible concentrating of the radio energy in certain directions. Furthermore, the device should be cost effective to produce.

The object is achieved according to the invention by the device, the field device adapter for wireless data transfer, and the field device of automation technology according to the present disclosure.

The device of the invention serving for transferring signals using electromagnetic waves of a certain wavelength and based on a housing formed at least partially of metal for use in an explosion endangered area, comprises:

the housing, which has a defined thickness and an essentially rotationally symmetric, preferably cylindrical, outer contour, a transmitting/receiving unit arranged in the housing for producing and/or receiving the electromagnetic waves, at least one primary antenna arranged in the housing for out- and/or in-coupling of the electromagnetic waves and transferring the electromagnetic waves to and from the transmitting/receiving unit, at least one slot-shaped housing opening that is embodied in such a manner that in interaction with the primary antenna the signals are transferred by the electromagnetic waves into, and out of, the housing, and a formed part, which is made of a material having a relative dielectric number significantly greater than one and which has a slot-shaped housing opening fitted, projecting, slot-shaped region, with which the formed part extends to a predetermined maximum depth into the housing opening, wherein the predetermined depth is selected in such a manner that a sphere or hemisphere (MK) with a diameter in the case of setting on the at least one slot-shaped housing opening does not contact the formed part, wherein the formed part has, furthermore, a region of a minimum breadth adjoining the slot-shaped region and surrounding the slot-shaped region, wherein the formed part with the surrounding region is pressed in the region surrounding the at least one slot-shaped housing opening against an inside of the housing and the minimum breadth of the surrounding region is embodied in such a manner that for a gas conforming to the standard IEC 60079-1 (27 Jun. 2014 edition) a shortest path through the at least one slot-shaped housing opening from the interior to an outside of the metal housing of at least 3 mm results, when a volume $V \leq 10$ cm$^3$, or at least 6 mm results, when $10$ cm$^3 < V \leq 100$ cm$^3$ or at least 10 mm results, when $V > 100$ cm3, wherein volume V is defined as the free space enclosed by the total housing.

According to the invention, the, preferably plastic, formed part, which in the following is also referred to as a guide, is specially protected, in that the part of the guide, which extends into the slot-shaped housing opening, is set back such that a sphere, which is allowed to fall on the slot-shaped housing opening according to the specifications of an impact resistance test, cannot damage the guide.

An advantageous embodiment of the device of the invention further comprises a seal, which is introduced between the slot-shaped region of the formed part provided in the at least one slot-shaped housing opening and a housing wall section defining the slot-shaped housing opening, so that a penetration of dust and/or water is prevented. Especially, the embodiment can provide that the seal is introduced into a lateral seat of the housing wall section and/or a lateral seat of the slot-shaped region.

Another advantageous embodiment of the device of the invention provides that the formed part is made of a plastic, especially polyethylene.

Another advantageous embodiment of the device of the invention includes, furthermore, a spring steel retainer, which is arranged in the interior of the housing and which is embodied to press the formed part with the surrounding region against the inside of the housing in a region surrounding the at least one slot-shaped housing opening. Especially, the embodiment can provide that the spring steel retainer has cross-sectionally essentially a U-shaped central region, on which is embodied on the two ends, in each case, an outwardly extending web, preferably at an angle of greater than 45°, wherein the webs are so dimensioned that the spring steel retainer lies against, or is supported on, at least two locations, or regions, of a housing wall, wherein the spring steel retainer has, furthermore, a recess and the formed part has, furthermore, two edges, of which each is embodied on a long side of the surrounding region and the recess and the edges are so embodied that the formed part can be introduced into the recess and the formed part lies with the edges on the spring steel retainer, so that the spring steel retainer presses the formed part with the surrounding region against the inside of the housing.

Another advantageous embodiment of the device of the invention includes, furthermore, arranged within the housing, a circuit board, which is embodied as primary antenna for out- and/or in-coupling of the electromagnetic waves such that the electromagnetic waves are out-, or in-coupled laterally at a circuit board edge and wherein the circuit board is so arranged in the housing that the circuit board edge is positioned toward the slot-shaped housing opening. Especially, the embodiment can provide that the circuit board is so held and arranged by a circuit board holder in the housing that the circuit board edge is positioned toward the slot-shaped housing opening.

Especially according to the embodiment, the primary antenna can be embodied in the form of a planar structure, especially in the form of a conductive trace, on the circuit board and arranged in a margin of the circuit board, wherein the conductive trace can be composed of two essentially parallel subsections, which are connected together via a 180° arc section.

Further according to the embodiment, the circuit board can include an HF-shielding fence, which preferably is embodied of at least one row of vias, wherein the HF-shielding fence can be embodied at least on the same side of the circuit board as the primary antenna and preferably can form a rectangular region adjoining the first side of the circuit board on the circuit board edge, in which the primary antenna is arranged.

Alternatively or supplementally according to the embodiment, it can also be provided that the circuit board includes HF-shielding sheet metal, which preferably has a metal containing, electrical component, such as, for example, a coil, a capacitor, a transformer, a terminal or the like, and wherein the HF-shielding sheet metal is embodied on the opposite side of the circuit board from the primary antenna and/or that the HF-shielding sheet metal and/or the HF-shielding fence are so arranged on the circuit board that the primary antenna is arranged between the HF-shielding sheet metal, or the HF-shielding fence, and the circuit board edge.

Another advantageous embodiment of the device of the invention provides that the formed part has means for holding and/or positioning the circuit board, especially one or more webs.

Another advantageous embodiment of the device of the invention provides that the formed part and/or the circuit board holder are, furthermore, so embodied that the circuit board with the circuit board edge bordering on the primary antenna is arranged in a longitudinal direction of the at least one slot-shaped housing opening essentially in parallel with a center line of the at least one slot-shaped housing opening and preferably with the circuit board edge essentially centrally in a transverse direction of the slot-shaped housing opening.

Another advantageous embodiment of the device of the invention provides that the circuit board holder and the spring steel retainer are so embodied relative to one another that the circuit board holder supports the spring steel retainer in the housing, in order to avoid a slipping and/or shifting.

Another advantageous embodiment of the device of the invention provides that the circuit board has at least one light means, especially an LED, which is arranged on the circuit board edge, and wherein preferably the length of the slot-shaped housing opening obeys $L_{slot}=\lambda/2+n_{LED} \cdot L_{LED}$, wherein $n_{LED}$ is the number of light means and $L_{LED}$ is a value of less than or equal to 2 mm. Especially, the embodiment can provide that the at least one light means is arranged on the circuit board edge outside, especially right or left therefrom, of a region of the circuit board located directly behind the slot-shaped housing opening and the formed part has a light waveguide, which is integrated and embodied in the formed part in such a manner that an optical signal transmitted from the light means is guided to the slot-shaped housing opening.

Another advantageous embodiment of the device of the invention provides that the at least one slot-shaped housing opening is embodied in such a manner that a length $L_{slot}$ of the slot-shaped housing opening=$\lambda/2 \pm \lambda/25$ and a breadth $B_{slot}$ of the slot-shaped housing opening <25 mm, preferably $B_{slot} \leq 10$ mm, especially preferably $B_{slot} \leq 6$ mm, quite especially preferably $B_{slot} \cong 4$ mm.

Another advantageous embodiment of the device of the invention provides that the housing is embodied in such a manner that a length $L_{housing}$ of the housing <$\lambda$, preferably $L_{housing}<0.95 \cdot \lambda$, especially preferably $L_{housing}<0.90 \cdot \lambda$.

Another advantageous embodiment of the device of the invention provides that the breadth $B_{slot}$ of the slot-shaped housing opening is, furthermore, $\geq 1/100 \cdot \lambda$.

Another advantageous embodiment of the device of the invention provides that a periphery, or circumference, $U_{housing}$, of the rotationally symmetric, preferably cylindrical, outer contour of the housing=$n \cdot \lambda/4$ with $n \in N$.

The invention relates further to a field device adapter for wireless data transfer in or from an explosion endangered area comprising a device according to one of the above described embodiments.

The invention relates further to a field device of automation technology comprising a field device adapter according to the above described embodiment, wherein the housing has at a second end a mechanical connecting element for connecting, especially screwing on, the field device adapter to an electrical cable gland of the field device.

BRIEF DESCRIPTION OF THE DRAWINGS

The invention will now be explained in greater detail based on the appended drawing, the figures of which show as follows.

DETAILED DESCRIPTION

Figure 1:
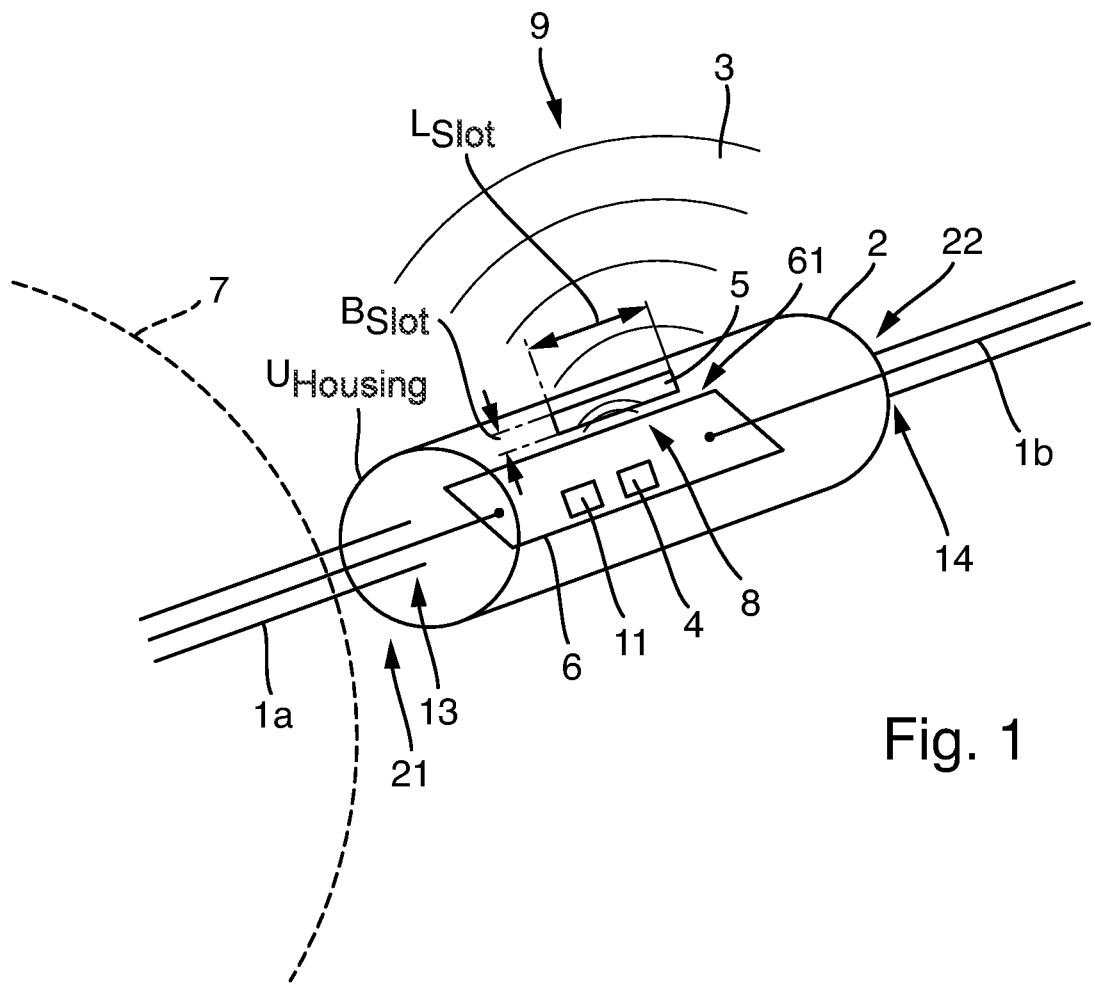
FIG. 1 shows a schematic view of a device for transferring signals using electromagnetic waves of a certain wavelength.

The device shown in FIG. 1 includes a housing 2, which is produced essentially of a metal, preferably a stainless steel. Housing 2 can alternatively, however, also be made of a plastic and be lined, preferably on its interior, with a metal layer. Housing 2 is, in such case, geometrically embodied in such a manner that it has externally an essentially rotationally symmetric, closed form. For example, the housing can, such as shown in FIG. 1, have an essentially cylindrical, outer contour. Of course, the housing can have openings, such as electrical passageways 13, 14 as well as a slot-shaped opening 5. Thus, ends 21, 22 of the cylindrical housing 2 can provide electrical cable passageways 13, 14, via which cables 1a, 1b each having at least one signal line extend into, or from, the housing 2. The cables 1a, 1 b can comprise, for example, the two-conductor lines usual in process and/or manufacturing automation. Alternatively, in one of the two end faces, a mechanical connecting element can be provided for connecting, especially screwing, the device to an electrical cable gland of a field device 7.

Arranged in the housing 2 is a circuit board 6, to which, or from which, the cable 1a, 1b with the signal line leads to, or leads away. Circuit board 6 includes a transmitting/receiving unit 11 for producing and receiving electromagnetic waves. Transmitting/receiving unit 11 can be, for example, an HF modem embodied in the form of a chip. Circuit board 6 includes, furthermore, a primary antenna 4 for out-coupling the produced electromagnetic waves and for in-coupling and transferring received electromagnetic waves, and can, furthermore, supplementally comprise a matching structure 15. The matching structure 15 can be embodied as part of the transmitting/receiving unit and/or part of the primary antenna. Alternatively, the matching structure 15 can also be embodied as an independent component of the circuit board 6.

Transmitting/receiving unit 11 is adapted to produce, and to receive, electromagnetic waves having a frequency band of 2.4 GHz, so that the signals transferred via the cable, or the two-conductor line, can be transferred by the device also wirelessly by means of Bluetooth (in given cases, also Bluetooth Low Energy) or one of the above mentioned variants.

Housing 2 includes a slot-shaped opening 5 having a length $L_{slot}$, wherein the length $L_{slot}$ can correspond to approximately a half-wavelength $\lambda/2$ of the electromagnetic wave. A breadth $B_{slot}$ of the slot-shaped opening 5 can be so selected that it is <25 mm, preferably $B_{slot} \leq 10$ mm, especially preferably $B_{slot} \leq 6$ mm, quite especially preferably $B_{slot} \cong 4$ mm. In the case of a frequency of 2.4 GHz and a wavelength of about $\lambda=122.36$ mm, the slot-shaped housing opening 5 can have, for example, a length in the range $L_{slot} \cong 61.18 \pm 4.89$ mm and a breadth of about $B_{slot} \cong 4$ mm. The slot-shaped opening 5 has no electrical connection to the circuit board 6 and is irradiated by the primary antenna 4 lying within the housing 2. Furthermore, the housing length $L_{housing}$ can be so selected that it is less than a wavelength 1·λ. Preferably, the housing length $L_{housing}$ can be <0.95·λ, especially preferably $L_{housing}$<0.90·λ. In this way, on the one hand, the housing does not act as a resonator at an operating frequency, and, on the other hand, no hollow conductor propagation is possible within the cylindrical housing 2.

Figure 2:
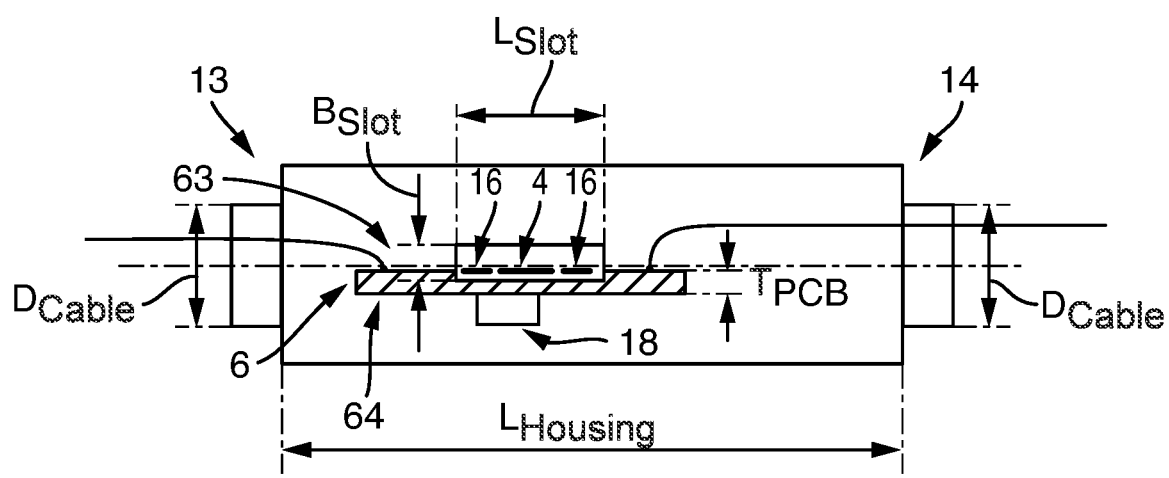
FIG. 2 shows a longitudinal section of the device shown in FIG. 1.

FIG. 2 shows a cross-section of the device shown in FIG. 1. It includes a side view of the circuit board 6, which is arranged in the housing 2. The housing includes two end faces 21, 22, in which, in each case, an electrical cable passageway 13, 14 (including cable and retainer) can be placed. In order that no high frequency energy is radiated laterally, a diameter $D_{cable}$ of the electrical passageways can be selected <¼·λ. FIG. 2 additionally shows the primary antenna 4, which is also referred to as the radiating structure. The primary antenna 4 forms together with the slot-shaped housing opening 5 and the housing 2 an antenna. In order to be able to test the circuit board 6 before installation, the primary antenna 4 can, furthermore, be embodied in such a manner that such has at least a slight antenna effect at least in the near field 8 even without the housing.

Figure 3:
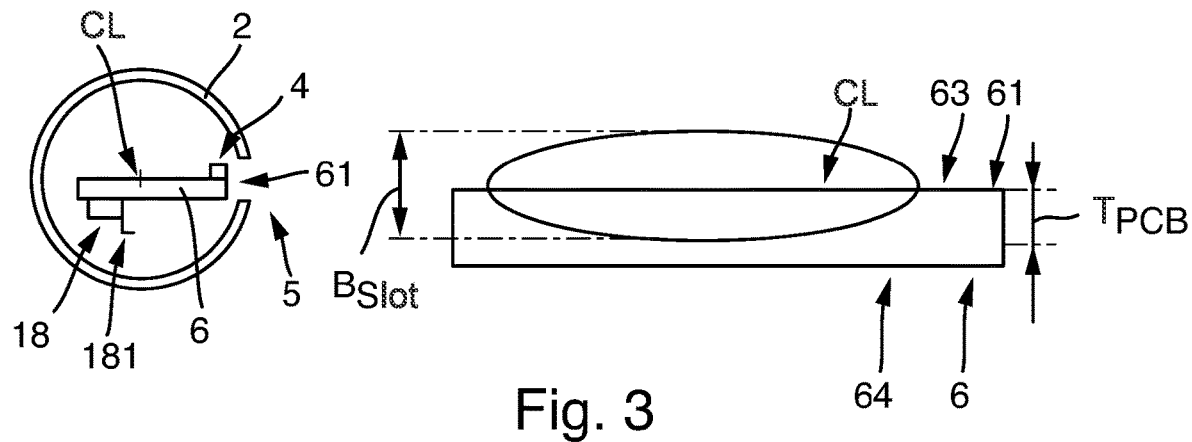
FIG. 3 shows a cross-section of the device and a detail view of the slot-shaped housing opening of the device.

FIG. 3 shows on the left side a cross-section of the device shown in FIGS. 1 and 2, in the case of which the circuit board 6 can preferably be so embodied that circuit board thickness $T_{PCB}>B_{slot}/2$, so that the circuit board 6 at least partially bridges the slot-shaped housing opening 5, especially at least half way, when the circuit board 6 with a circuit board edge 61, on which the primary antenna 4 borders, is oriented on a midpoint MP of the diameter of the cylindrical housing 2.

FIG. 3 further shows on the right side a detail view, in order to illustrate a possible arrangement between the circuit board 6 and the slot-shaped housing opening 5. Circuit board 6 can, furthermore, be arranged with the circuit board edge 61 neighboring the primary antenna 4 in parallel with a center line CL of the slot-shaped housing opening 5.

Figure 4:
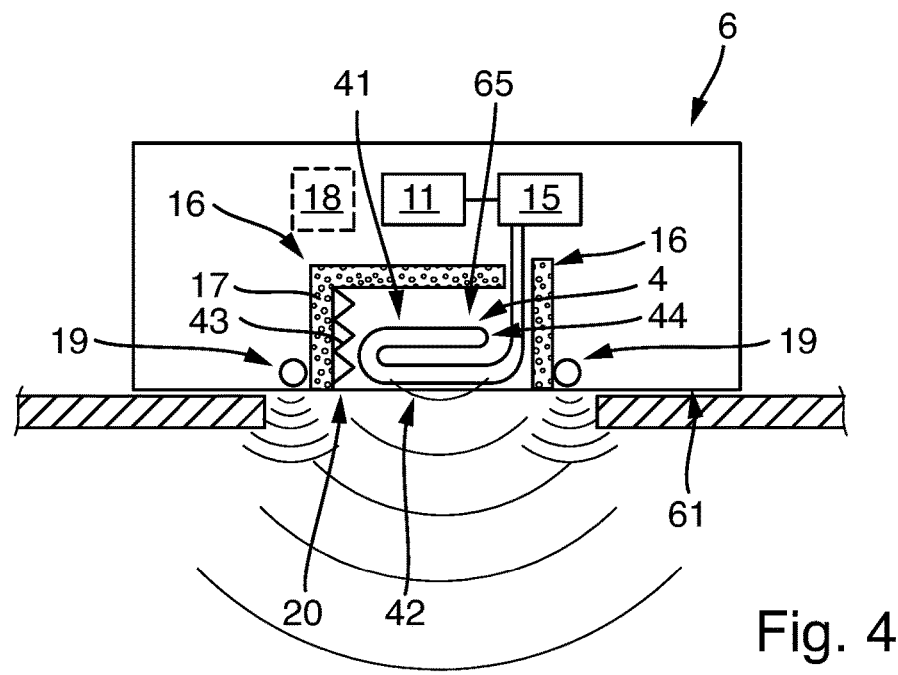
FIG. 4 shows a schematic view of the slot-shaped housing opening and the circuit board, which illustrates the arrangement of the two relative to one another.

FIG. 4 likewise shows a schematic view of the slot-shaped housing opening 5 and the circuit board 6, in order to describe the embodiment of the circuit board 6 in greater detail.

Thus, circuit board 6 can include an HF-shielding fence 16, which is composed of vias 17. Vias 17 can, in such case, be so embodied that they extend from a first side of the circuit board (top) 63 to a second side of the circuit board (bottom) 64. This means that the vias 17 can extend through all plies of the circuit board 6. Alternatively, the vias 17 can also be so embodied that they extend only from the first side of the circuit board 63 to a middle circuit board ply. The HF-shielding fence 16 can preferably be embodied as two rows, in order to achieve a maximum fence effect also in the case of small, cost effectively produced vias and to bring about a very strong reduction of the influence of other elements in the housing, such as, for example, screwed in cable. Because of the HF-shielding fence 16, an essentially rectangular region 65 on the first side of the circuit board 63 can be defined, which is limited to one side of the circuit board edge 61.

The HF-shielding fence 16 can, furthermore, be supplemented by an HF-shielding sheet metal 18, which is arranged on the second side of the circuit board (rear face) 64. FIG. 4 indicates the arrangement of the HF-shielding metal sheet metal on the rear face of the circuit board by the dashed line. The HF-shielding sheet metal 18 can besides the shielding of the HF waves also fulfill another function on the circuit board 6. For example, the HF-shielding sheet metal 18 can comprise a metal containing electrical component, such as, for example, a coil, a capacitor, a transformer, a terminal or the like, wherein the HF-shielding sheet metal 18 is preferably electrically connected with the HF-shielding fence 16. Alternatively, also other metal parts on the circuit board 6, components with high metal content, such as a coils or components of materials with high DK, such as flat SMD-capacitors, can serve as HF-shielding sheet metal 18.

Furthermore, such as shown in FIG. 4, the circuit board 6 can include the transmitting- and/or receiving unit 11, the primary antenna 4, the matching structure 15 for impedance matching between the transmitting- and/or receiving unit 11 and the primary antenna 4 and two LEDs 19. The LEDs can serve to transmit an optical signal, in order, for example, to signal a status of the device. In order that the LEDs can be seen outside of the housing 2, the length of the slot-shaped housing opening can be enlarged by a range specific for the LED. For example, the length of the slot-shaped housing opening can be lengthened right and left by a millimeter (1 mm). This means, in this case, that the length $L_{slot}$ of the slot-shaped housing opening=λ/2+$n_{LED} \cdot L_{LED}$≅63.18 mm with $n_{LED}$=2 and $L_{LED}$=1 mm. As a result of interference effects due to the thickness of the housing, the elongated slot-shaped housing opening behaves not as an elongated recess, but, instead, HF-technically, rather greatly as an oval, so that it can be lengthened on both ends by 1 to 2 mm without great effect.

As evident from FIG. 4, the primary antenna 4 can be arranged in the rectangular region 65. Primary antenna 4 can be embodied preferably in the form of a conductive trace 41, 42, 43, 44, which can have an active part 42 and an inactive part 41. The active and inactive parts 41, 42 can be connected together via a 180° arc section 43, so that the conductive trace has a particular total length, in order to act as a resonator at a center frequency. Finally, this length can be terminated by a rounded region 44, in order to lessen the quality of the resonator, and, indeed, sufficiently to keep a transient ringing below a path length of the Viterbi algorithm of the particular transmitting- and/or receiving unit.

The active part 42 serves in this case as actual "radiator", wherein the energy of the inactive part 41 can be led away via a ground area 181 of the HF-shielding metal sheet metal 18 extending from the HF-shielding fence 16 to the circuit board underside 64, in order that the inactive part 41 does not to act as "radiator". The interaction of the active and inactive parts 41 and 42 enables the forming of a radiator, which would otherwise extend over an entire breadth of the slot-shaped housing opening 5, to a breadth, which is somewhat narrower than the slot-shaped housing opening 5. In this way, interference effects on the outer edges of the slot-shaped housing opening can only partially influence the radiator in defined manner and nevertheless radiation through the slot-shaped housing opening is still possible. The ground area 181 can have especially an L shaped structure in side profile. In order to increase the efficiency of the draining away, furthermore, a structure can be placed on the bottom part of the circuit board 64. The structure can comprise, for example, also an HF-shielding sheet metal or other metal part. In this way, the residual power can be deflected and radiated to the slot-shaped housing opening 5. This leads supplementally to a better matching of the antenna (−20 . . . 30 dB in the range+−5% around the center frequency) and, furthermore, to an additional stability of production tolerances. The radiation of the necessary 180° arc section 43 can be matched with a structure 20, which likewise can be arranged in the rectangular region of the circuit board 65, to an impedance value just above zero ohm, in order then to be passed into the HF-shielding fence 16. The structure can have in a plan view of the circuit board a sawtooth profile, for example.

Circuit board 6 can be oriented in such a manner in the housing 2 that the outer vias continuing to the circuit board edge 61 can have at the slot breadth in the longitudinal direction, in each case, a separation of about 1 mm from the edges of the slot-shaped housing opening.

Figure 5:
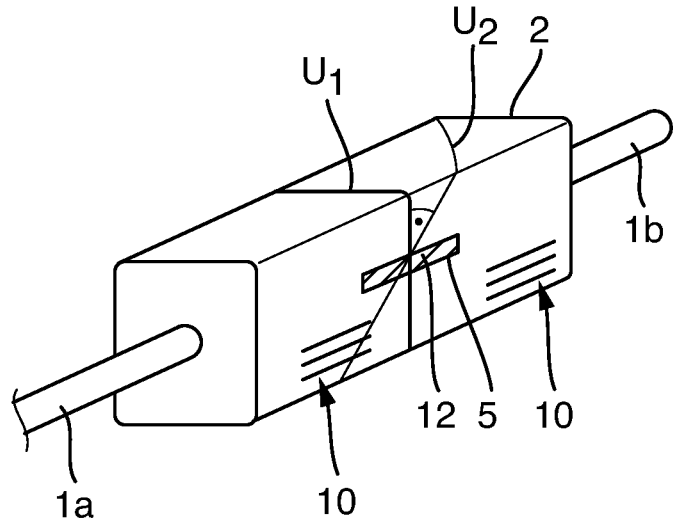
FIG. 5 shows a schematic view of an additional embodiment of a device.

FIG. 5 shows a schematic view of an additional embodiment of the device, in the case of which the housing 2 can have a times 4 rotationally symmetric outer contour. In order to be able to apply the device in regions, in which danger of explosion is present (so-called explosion endangered areas, "Ex regions" for short), the slot-shaped opening 5 is filled with another material than air, especially an electrically non-conductive material, e.g. glass. Plastics, especially polyethylene, have proved to be especially suitable as electrically non-conductive materials.

In supplementation, or alternatively, such as shown in FIG. 5, the housing can be geometrically embodied in such a manner that at least two outer HF circuit paths U1, U2 measured in two, large scale, spatial directions, preferably outer HF circuit paths in each spatial direction of the housing, correspond each to an integer multiple of a half-wavelength $\lambda/2$ of the electromagnetic wave, with which the signals are transmitted. The HF circuit paths can be measured, or established, in such case, in such a manner that they pass, in each case, through the slot-shaped housing opening. Preferably, the HF circuit paths can be so established that they extend through a center of the slot-shaped housing opening.

Figure 6:
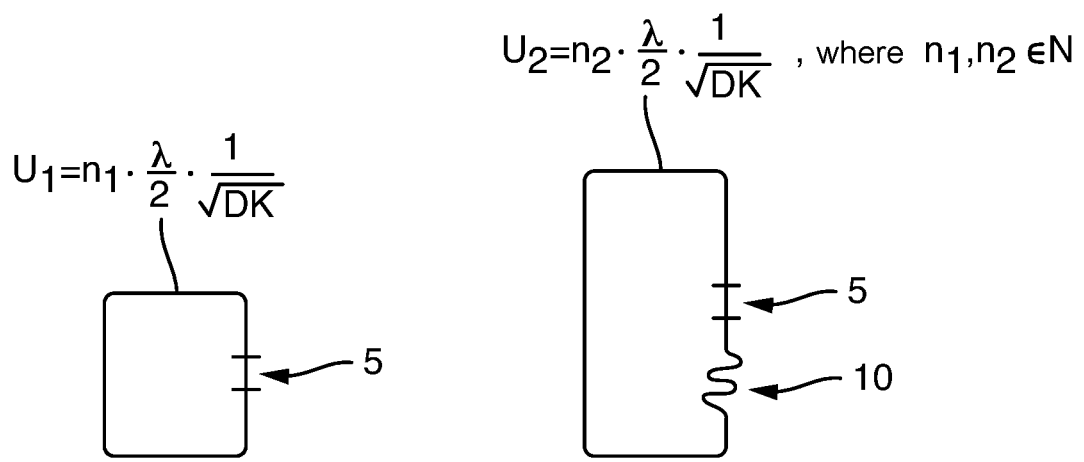
FIG. 6 shows the HF circuit paths U1 and U2 perspectively shown in FIG. 5, shown in this case in a plane for clarifying the operation of the delay elements.

For further detailing the HF-circuit paths U1 and U2 perspectively illustrated in FIG. 5, they are shown again in FIG. 6, this time in a plane. FIG. 6 shows that each HF circuit path U1 and U2 passes through the slot-shaped housing opening 5.

In order locally to lengthen a round-trip time of a wave, i.e. to introduce a delay, one or more circuit delay elements 10 can be embodied on an external surface of the housing 2. Shown in FIG. 5 by way of example are two delay elements 10 placed on the housing outer surface. The delay elements 10 shown in FIG. 5 can be embodied as groove shaped elements. Another option is, however, also point shaped elements or elements, which can be embodied of another material than the housing 2, especially a dielectric material or a high frequency metamaterial. By appropriate positioning, the HF circuit path can be intentionally changed, especially enlarged, in one or more spatial directions. It is to be noted that, depending on structure size of the circuit delay elements, an HF-circuit path is, as a rule, slightly less than the (mechanical) path, such as, for example, $U_{housing}$, since the electromagnetic wave partially jumps over especially small structures and, by the interaction of the E- and H fields, on the whole, a slight shortening results.

Figure 7:
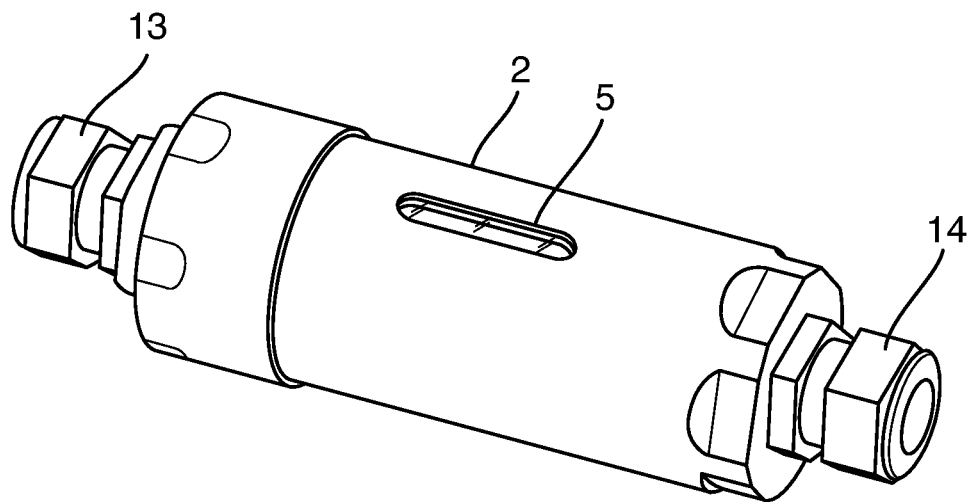
FIG. 7 shows a perspective view of the device of the present disclosure.

FIG. 7 shows a schematic view of the device of the invention. The device includes a metal housing having a defined thickness $T_{housing}$ (wherein the housing with reference to an outer contour and with exception the slot-shaped housing opening 5 is preferably essentially rotationally symmetric about a central axis), a slot-shaped housing opening 5 and an electrical cable passageway 13, 14 on each end 21, 22. Housing 2 is, furthermore, embodied in such a manner that it is usable in an explosion endangered area, especially a gas explosion endangered area. For this, the housing is embodied in such a manner that it satisfies the requirements of the ignition protection type, "pressure resistant encapsulation" (designated Ex-d) according to the international standard IEC 600798-1 (edition 27 Jun. 2014). In the case of this ignition protection type, the propagation of an explosion is prevented. Here, the protection rests essentially on structural measures, so that a penetration of gases is, indeed, not prevented, and in the case that an ignition occurs in the interior of the housing, the housing withstands the pressure of the explosion and the ignition does not propagate to the outside. In order to satisfy the requirements of ignition protection type, "pressure resistant encapsulation", the metal housing 2 has in the simplest case a corresponding minimum thickness, for example, 3 mm. However, the presence of the slot-shaped housing opening 5, represents an increased structural challenge for meeting the requirements of ignition protection type, "pressure resistant encapsulation".

Figure 8:
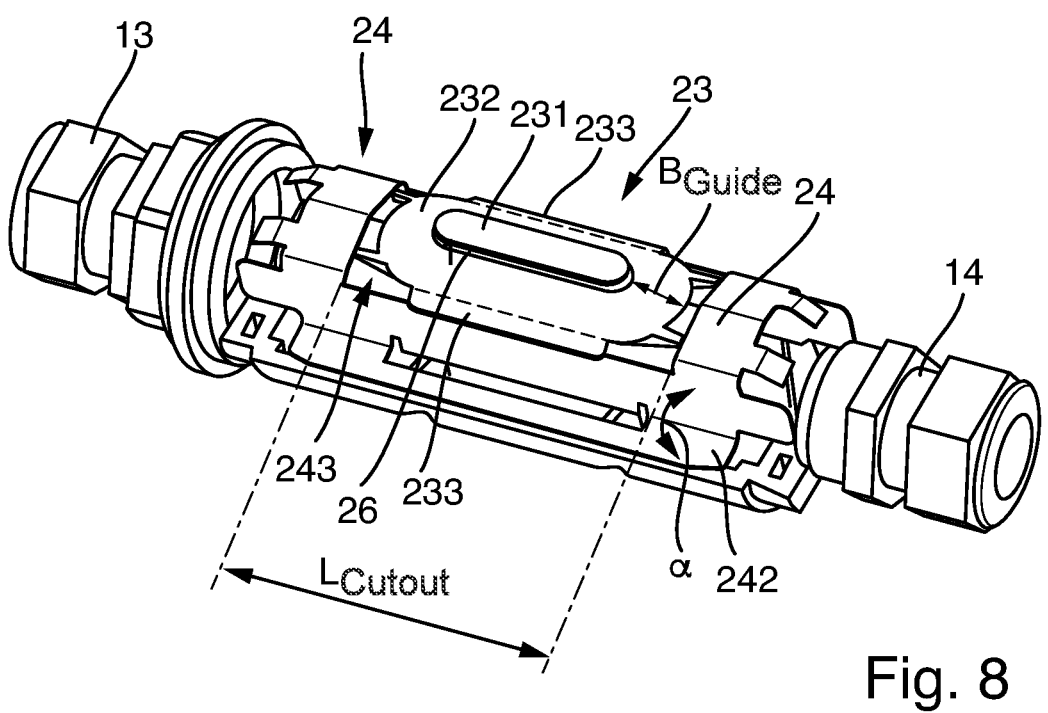
FIG. 8 shows a perspective view of the device of the present disclosure with parts of the housing removed for clarity.

FIG. 8 omits the outer housing, in order to show the inner construction of the device of FIG. 7. In principle, the device is composed of individual components, which come together, for example, are plugged together, in order to build the device of the invention.

As shown in FIG. 8, there lies in the region of the slot-shaped housing opening 5, made of a material having a relative dielectric number (a dimensionless number) significantly greater than one ($\varepsilon_r>1$), a formed part, which is especially transparent for electromagnetic radiation in the visible range, and which is, thus, also referred to in the following as guide 23. For example, the guide 23 can be made of a plastic, especially polyethylene (PE). Alternatively, the guide 23 can also be made of a glass. Because of the choice of the relative dielectric number $\varepsilon_r$ significantly greater than one, a shortening of the wavelength $\lambda$ is effected. Guide 23 is embodied in such a manner that it has a projecting slot-shaped region 231, which in the case of applied housing 2 extends into the slot-shaped housing opening 5 to a predetermined depth $D_{guide}$. Furthermore, the guide 23 includes a region 232 having a defined minimum breadth $B_{guide}$ and surrounding the slot-shaped region 231 on all sides. The minimum breadth is selected, in such case, in such a manner that a shortest path conforming to the standard IEC 60079-1 (edition 27 Jun. 2014) for the slot-shaped housing opening of the metal housing from an interior to an outside amounts to at least 3 mm, when a volume $V \leq 10$ cm$^3$, or at least 6 mm, when the volume lies in the range 10 cm$^3 < V \leq 100$ cm$^3$ or at least 10 mm, when the volume $V>100$ cm$^3$, wherein the free space enclosed by the total housing is defined as volume V. In an especially preferred embodiment, the defined minimum breadth amounts to 6 mm.

Figure 9:
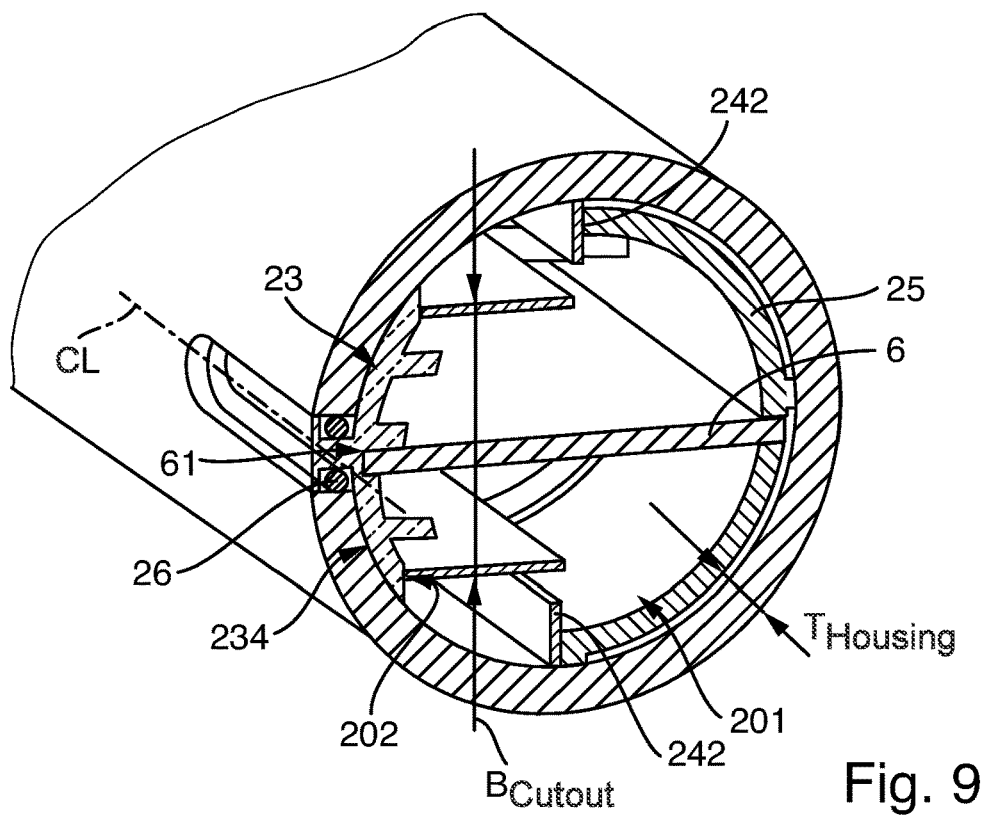
FIG. 9 shows a cross-section of the device of the present disclosure.

FIG. 9 shows a cross-section of the device of the invention. As evident from FIG. 9, an outer surface of the surrounding region 232 is so matched to the housing wall that the surrounding region 232 in the installed state lies as flush as possible against the interior of the housing 2. Because of the corresponding embodiment of the guide 23, it results that such has an essentially oval contour in a plan view, wherein for mechanically connecting the guide 23 to the housing 2, furthermore, two edges 233 are provided as contact areas. The two edges 233 are appended to the surrounding region 232 on long sides of the guide. Via the edges 233, the guide 23 in the installed state can be pressed by a spring steel retainer 24 against the interior of the housing. In order that an as uniform as possible force distribution and, thus, an areal pressing of the guide 23 against the interior of the housing 2 occurs, a surface section of the surrounding region 232 is matched to a surface section of the interior of the housing 2 around the slot-shaped housing opening 5. This means that the guide 23 has cross-sectionally an essentially curved contour.

In order to avoid penetration of dust and/or water, the projecting slot-shaped region 231 of the guide 23 includes, such as shown in FIG. 9, on the lateral surface directed in the installed state toward the housing wall a seat 235 for a seal 26. Provided as seal can be, for example, a surrounding, oval ring, which in the installed state is introduced into the seat 235.

Figure 10:
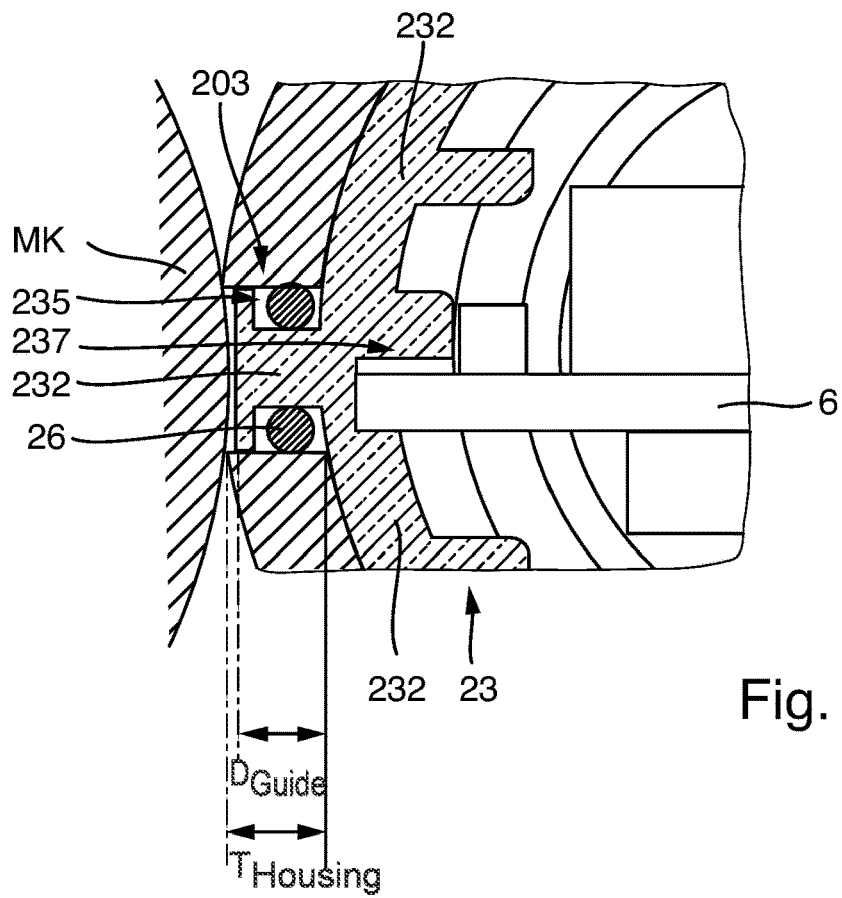
FIG. 10 shows a detail view of the slot-shaped housing opening, which illustrates an embodiment of the guide according to the present disclosure.

FIG. 10 shows a detail view of the slot-shaped housing opening 5, in order to illustrate the embodiment of the guide 23 of the invention. According to the invention, the projecting slot-shaped region 231 of the guide 23 is so embodied that in the installed state it extends to the maximum predetermined depth $D_{guide}$ into the slot-shaped housing opening 5, wherein the maximum predetermined depth $D_{guide}$ is selected in such a manner that a sphere, or hemi-sphere MK, in the case of falling on the slot-shaped housing opening just does not contact the slot-shaped region introduced into the slot-shaped housing opening 5. FIG. 10 schematically shows the sphere labeled with the reference character MK. Suitable as sphere, or hemi-sphere is, especially, a hardened steel ball having a diameter of 25 mm. The impact resistance testing is performed especially according to international standard IEC 60079-0 (edition 13.12.2017).

In order to mechanically secure the guide 23 against the housing 2, more specifically the inner surface of the housing 2, the spring steel retainer 24 is provided, which serves to press the guide 23 against the interior of the housing 2. For this, the spring steel retainer 24 has cross-sectionally in a central region an essentially U shape, at whose two ends, webs 242 protrude at angles of about 90°, so that the spring steel retainer bears on the housing wall at at least two locations. For seating the guide, the spring steel retainer includes in the central region a recess, which is so embodied that the guide can be introduced into the recess and the guide 23 lies flush with the two edges 233 on the edges of the recess 243.

In order to influence the wave propagation as little as possible, the recess 243 of the spring steel retainer 24 is so embodied that a length of the recess $L_{cutout}$ is meaningfully greater than the breadth of the slot-shaped housing opening $B_{slot}$ or when, in each case, a light means, for example, an LED, is provided on the circuit board right and left of the HF-shielding fence 16, the breadth of the recess is adequately greater than a separation of the two light means from one another. As regards a breadth $B_{cutout}$ of the recess, the spring steel retainer 24 is so embodied that the breadth is matched to an inner diameter of the housing 2, wherein the breadth is preferably selected as large as possible.

The spring steel retainer 24 is held in the housing 2 on a plastic formed part 25, which simultaneously serves as support for the circuit board 6. The plastic formed part 25 is likewise so embodied that it has a surface contour matched to a surface contour of the interior of the housing. The plastic formed part 25 is so embodied that in the installed state in the longitudinal direction, the circuit board 6 with the circuit board edge 61 bordering the primary antenna 4 is positioned in parallel with a center line CL of the slot-shaped housing opening 5. Furthermore, such as shown in FIG. 3, the circuit board can be arranged in a transverse direction of the slot-shaped housing opening such that the circuit board edge 61 is essentially centered. For exact positioning of the circuit board edge 61, the guide 23 can have one or more fins 237, which hold and/or position the circuit board 6. The fins 237 can be embodied, for example, in the form of an elongated, cross-sectionally U-shaped groove, into which the circuit board 6 can be plugged.

Figure 11:
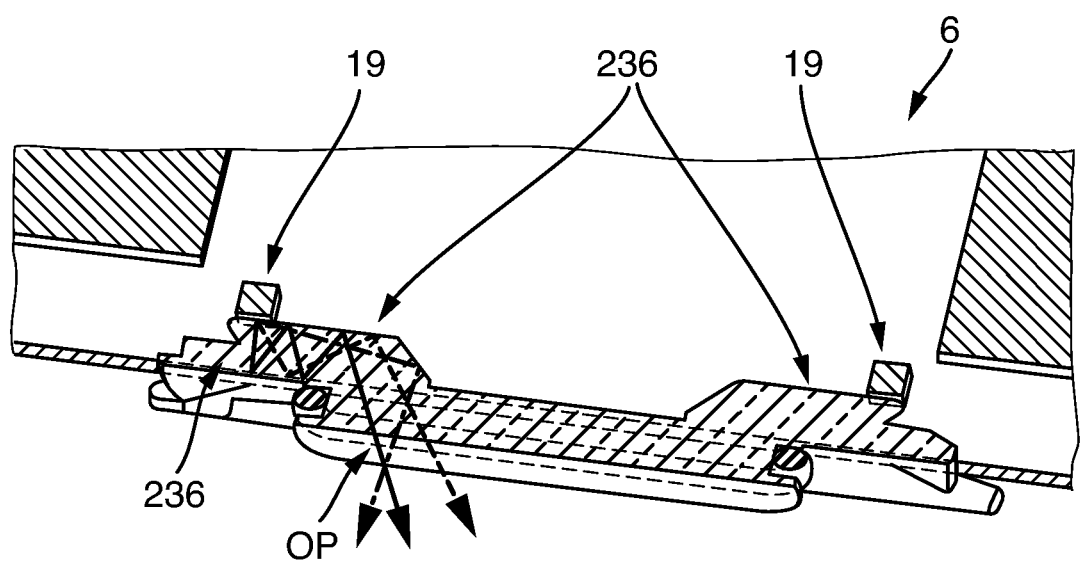
FIG. 11 shows a cross-section of the formed part, or guide.

FIG. 11 shows a cross-section of a part of the formed part, or guide, 23, in order to illustrate another embodiment of the device of the invention. In such case, guide 23 is so embodied that it contains an internal light waveguide 236, via which an optical path OP from an entrance- to a point, or region, of emergence is provided for the optical signal. Shown in FIG. 11 by way of example are three different optical paths. Because of the light waveguide 236 formed within the guide, the LEDs can be arranged on the circuit board 6 in such a manner that they do not need to be arranged directly behind the slot-shaped housing opening 5, but, instead, can be arranged on the circuit board 6 outside of a region shadowed by the slot-shaped housing opening. Via the light waveguide, the optical signal is then led from an entrance point, or region, which is directly by the light means, to the point, or region, of emergence. The point or region of emergence can lie, in such case, especially in the region, where the length of the slot-shaped housing opening has been enlarged due to the LEDs. For example, such as shown by way of example in FIG. 11, in the case, in which two light means are provided on the circuit board, the slot-shaped housing opening can be lengthened right and left by a length of about one millimeter (1 mm), and the optical signal can be led from the light means 19 via the light waveguide 236 to these regions.

The invention claimed is:

1. A device for transferring signals using electromagnetic waves of a certain wavelength, the device comprising:
    a housing made at least partially of metal and configured for use in an explosion endangered area, wherein the housing has a defined thickness and an essentially rotationally symmetric outer contour;
    a transmitting/receiving unit disposed in the housing and configured to produce and/or receive the electromagnetic waves;
    an antenna disposed in the housing and adapted for out-coupling and/or in-coupling of the electromagnetic waves and for transferring the electromagnetic waves to and from the transmitting/receiving unit;
    a slot-shaped housing opening adapted to enable the signals to be transferred by the electromagnetic waves into and out of the housing via interaction with the antenna; and
    a formed part, which is made of a material having a relative dielectric number significantly greater than one, including a projected slot-shaped region complementary to the housing opening with which the formed part extends to a predetermined maximum depth into the housing opening, wherein the predetermined maximum depth is configured such that a sphere or hemi-sphere having a gauge diameter does not contact the formed part when seated on the housing opening,
    wherein the formed part includes a region of a minimum breadth adjoining the slot-shaped region and surrounding the slot-shaped region, wherein the formed part with the surrounding region is pressed in the region surrounding the housing opening against an interior of the housing and the minimum breadth of the surrounding region is configured such that, for a gas conforming to the standard IEC 60079-1, a shortest path through the housing opening from the interior to an outside of the housing is:
    at least 3 mm when a volume defining a free space enclosed by the housing is less than or equal to 10 $cm^3$;

at least 6 mm when the volume is greater than 10 cm³ and less than or equal to 100 cm³; or at least 10 mm when the volume is greater than 100 cm³.

2. The device of claim 1, further comprising a seal disposed between the slot-shaped region of the formed part disposed in the housing opening and a housing wall section defining the housing opening, the seal configured and disposed such that a penetration of dust and/or water into the housing is prevented.

3. The device of claim 2, wherein the seal is seated into a lateral seat of the housing wall section and/or a lateral seat of the slot-shaped region.

4. The device of claim 1, wherein the formed part is made of a plastic.

5. The device of claim 1, further comprising a spring steel retainer disposed in the interior of the housing and configured to press the formed part with the surrounding region against the interior of the housing in a region surrounding the housing opening.

6. The device of claim 5, wherein the retainer includes cross-sectionally an essentially U-shaped central region, the retainer having two ends, each of which includes an outwardly extending web structure at an angle greater than 45°, wherein each web structure is configured such that the retainer rests against, or is supported on, at least two locations of a housing wall of the housing, wherein the retainer further includes a recess, and the formed part includes two edges, each of which extends from a long side of the surrounding region, and wherein the recess and the edges are configured such that, when the formed part is introduced into the recess, the formed part rests with the edges on the retainer such that the retainer presses the formed part with the surrounding region against the interior of the housing.

7. The device of claim 1, further comprising a circuit board disposed within the housing and including the antenna, wherein the antenna is configured for out-coupling and/or in-coupling of the electromagnetic waves such that the electromagnetic waves are out-coupled and/or in-coupled laterally at a circuit board edge, and wherein the circuit board is arranged in the housing such that the circuit board edge is positioned toward the housing opening.

8. The device of claim 7, further comprising a circuit board holder configured to hold and arrange the circuit board in the housing such that the circuit board edge is positioned toward the housing opening.

9. The device of claim 8, wherein the formed part includes a member configured to hold and/or position the circuit board.

10. The device of claim 8, wherein the formed part and/or the circuit board holder are configured such that the circuit board is disposed with the circuit board edge adjacent the antenna in a longitudinal direction of the housing opening, essentially parallel to a centerline of the housing opening, and in a transverse direction of the housing opening with the circuit board edge essentially centered therewith.

11. The device of claim 8, wherein the circuit board holder and the retainer are configured relative to each other such that the circuit board holder supports the retainer in the housing as to prevent slipping.

12. The device of claim 7, wherein the circuit board includes at least one light source arranged on the circuit board edge, and wherein a length of the housing opening is defined by:

$$\lambda/2 + n_{LED} \cdot L_{LED},$$

wherein $\lambda/2$ is a half-wavelength of the electromagnetic waves, $n_{LED}$ is the number of light sources, and $L_{LED}$ is a value of less than or equal to 2 mm.

13. The device of claim 12, wherein the at least one light source is arranged on the circuit board edge outside a region of the circuit board disposed directly behind the housing opening, and wherein the formed part includes a light waveguide integrated and configured in the formed part such that an optical signal transmitted from the at least one light source is guided to the housing opening.

14. The device of claim 1, wherein the housing opening has a length defined by $\lambda/2 \pm \lambda/25$ and a breadth less than 25 mm, wherein $\lambda$ is the wavelength of the electromagnetic waves.

15. The device of claim 1, wherein the housing has a length less than $\lambda$, wherein $\lambda$ is the wavelength of the electromagnetic waves.

16. The device of claim 1, wherein a breadth of the housing opening is greater than or equal to $1/100 \cdot \lambda$, wherein $\lambda$ is the wavelength of the electromagnetic waves.

17. The device of claim 1, wherein a periphery of the outer contour of the housing is defined by $n \cdot \lambda/4$, wherein $\lambda$ is the wavelength of the electromagnetic waves, and n is a natural number.

18. A field device adapter for wireless data transfer into, or from, an explosion endangered area, the field device adapter comprising a device according to claim 1.

19. A field device of automation technology, the field device comprising a field device adapter including a device according to claim 1, wherein the housing includes at an end a mechanical connecting element configured to connect the field device adapter to an electrical cable gland of the field device.

\* \* \* \* \*